April 12, 1938.　　　　R. C. BALL　　　　2,114,013
VALVE CONTROL
Filed Nov. 16, 1935　　　5 Sheets-Sheet 1
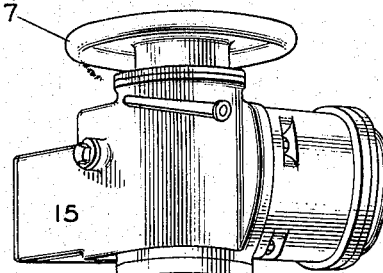
FIG. 1
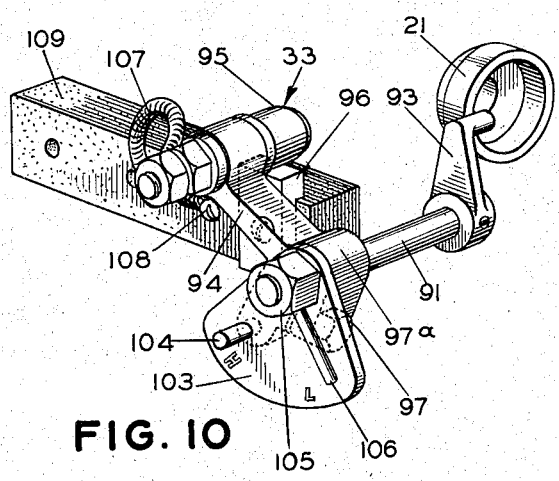
FIG. 10
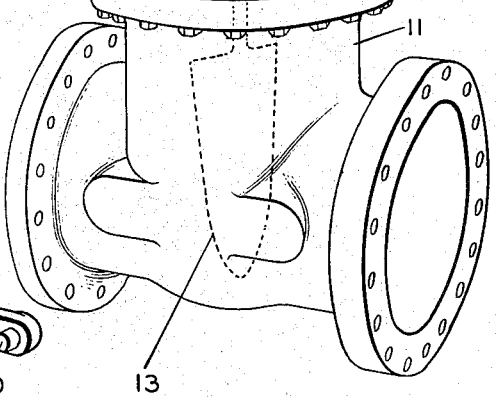
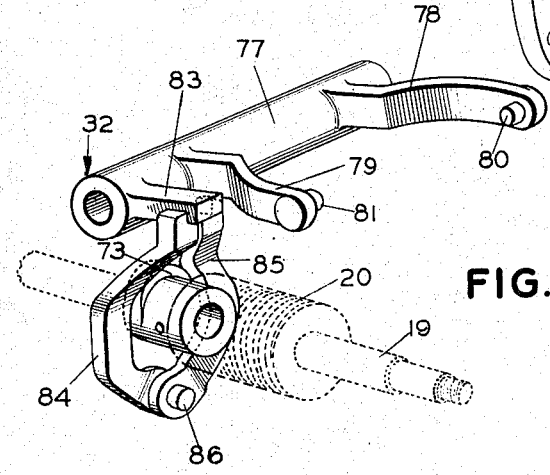
FIG. 9
INVENTOR.
RUSSELL C. BALL
BY  *Arthur Middleton*
ATTORNEY.

April 12, 1938.   R. C. BALL   2,114,013
VALVE CONTROL
Filed Nov. 16, 1935   5 Sheets-Sheet 2

INVENTOR.
RUSSELL C. BALL
BY Arthur Middleton
ATTORNEY.

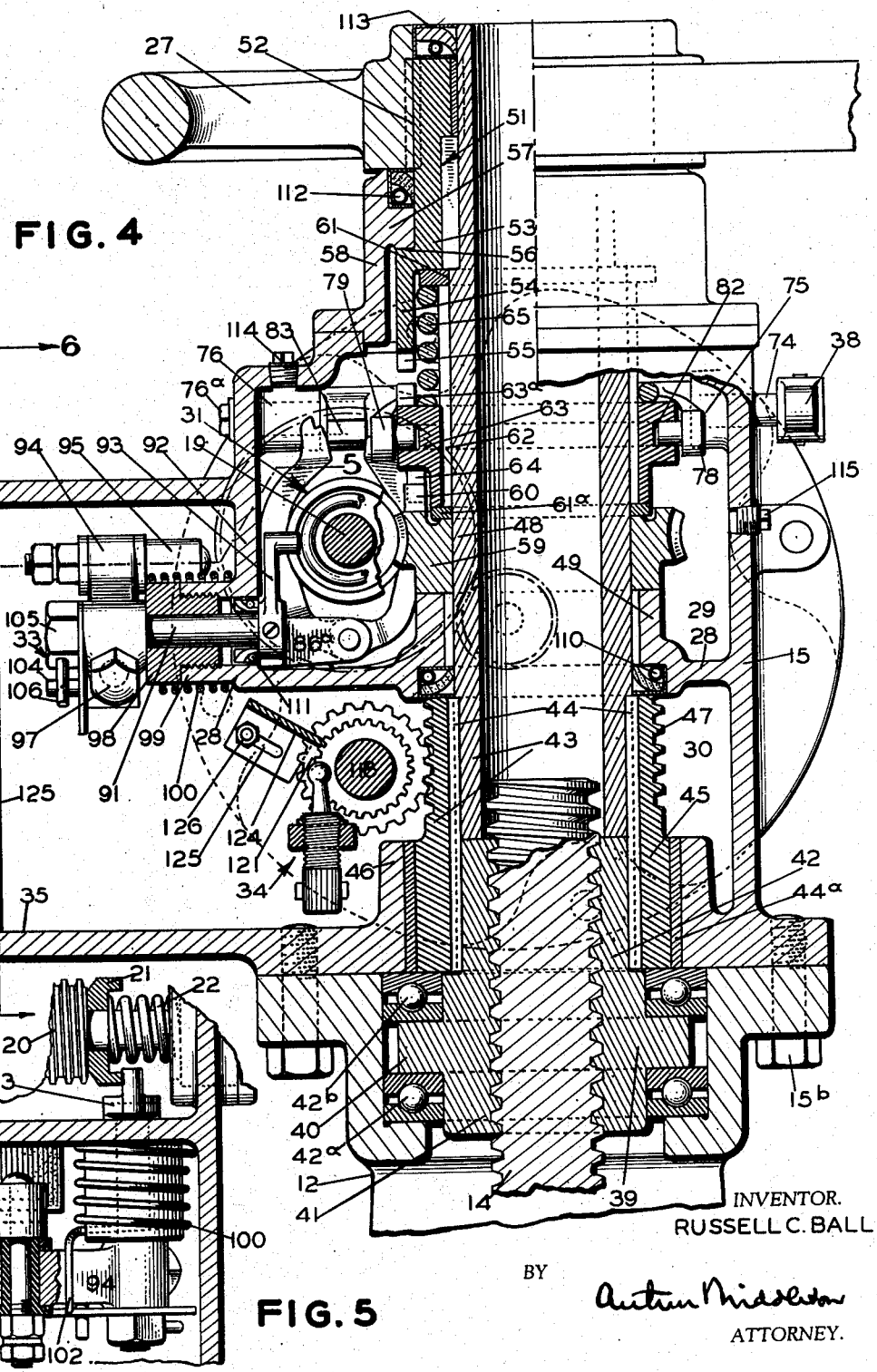

April 12, 1938.                    R. C. BALL                    2,114,013
                                 VALVE CONTROL
        Filed Nov. 16, 1935                              5 Sheets-Sheet 4
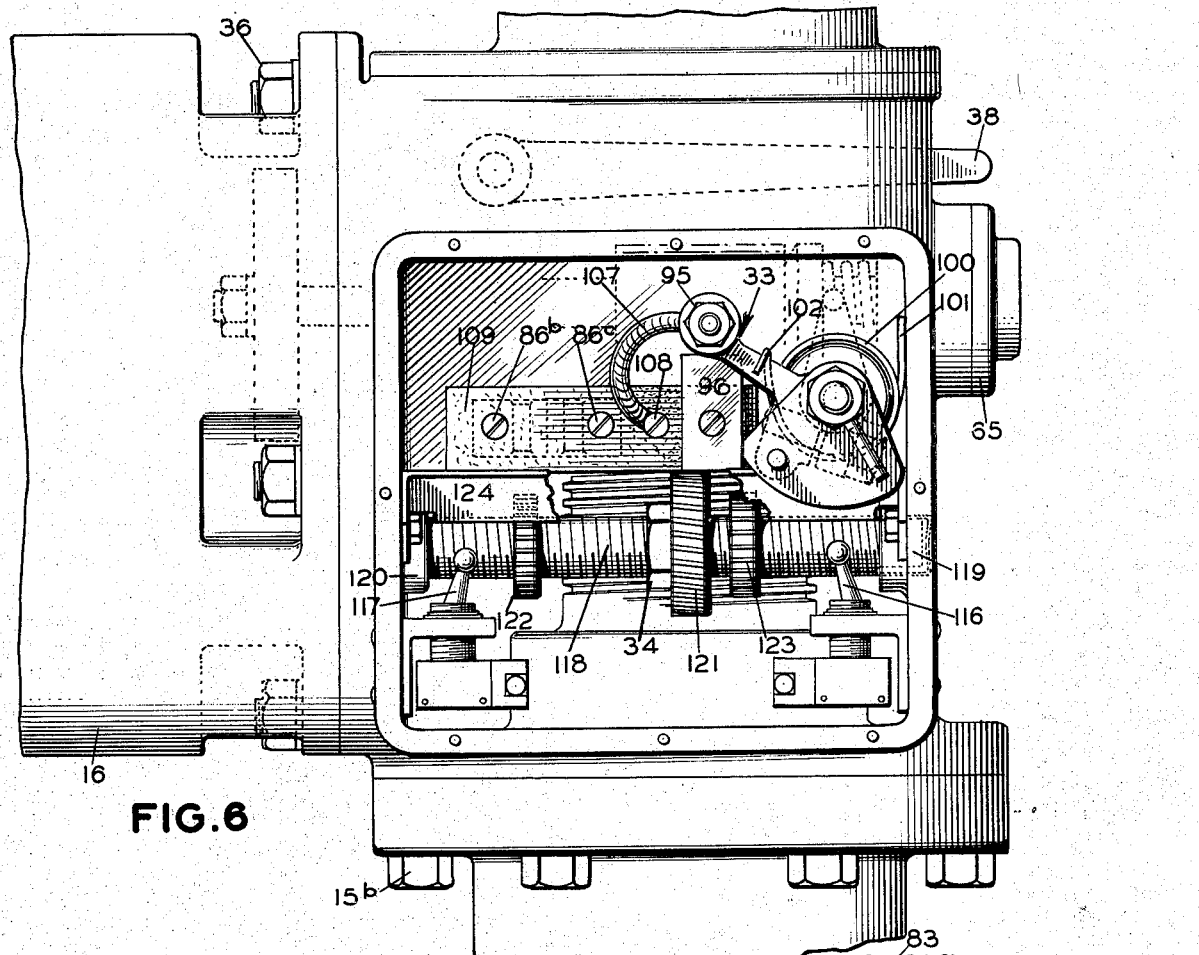
FIG. 6
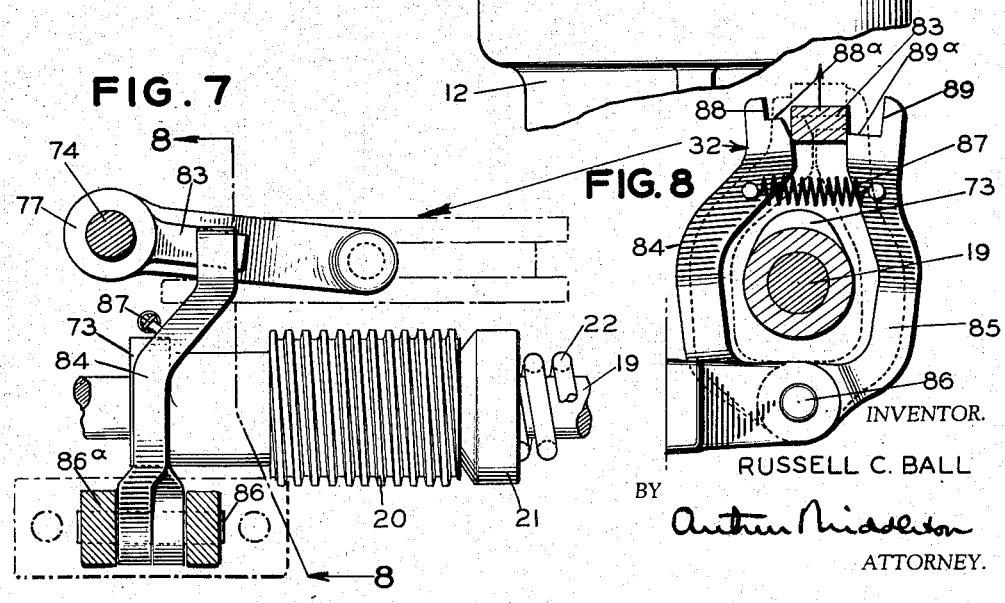
FIG. 7
FIG. 8
INVENTOR.
RUSSELL C. BALL
BY
Arthur Middleton
ATTORNEY.

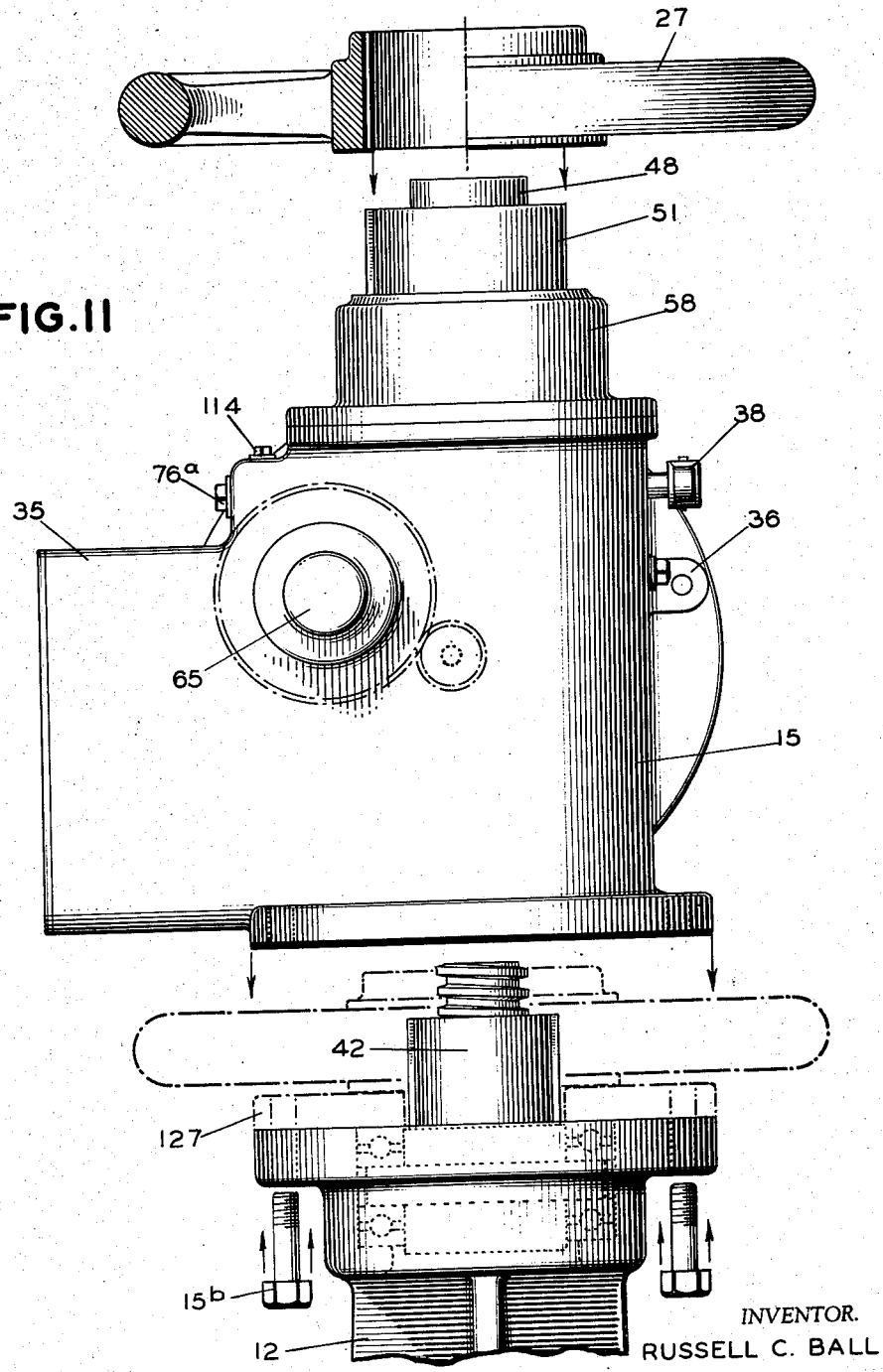

Patented Apr. 12, 1938

2,114,013

UNITED STATES PATENT OFFICE 2,114,013

VALVE CONTROL

Russell C. Ball, Philadelphia, Pa.

Application November 16, 1935, Serial No. 50,079

15 Claims. (Cl. 192—142)

This invention relates to motorized drive and control mechanism for power-operated valves. More particularly, it has to do with motor operated valves wherein the motor alternately effects the closing and the opening of the valve or valve gate, and wherein arrangement is made for automatically controlling the limit of opening and closing of the valve gate as operated by the motor.

The main object of this invention is to convert ordinary hand-operated valve units into power operated units in such a manner that the valve can be selectively operated by power or by hand. Consequently, one object is to devise a compactly housed and self-contained motor mechanism with its limit controls or switches so that it is readily adaptable to a conventional valve construction without requiring any substantial modification thereof.

Another object is to devise a suitable arrangement of clutch and clutch operating means for selectively changing from manual to power operation, and vice versa. In more specific terms, one object is to provide improved functional and structural coordination between the manual and the power operated mechanism, so as to avoid a coincidence of manual and power operation whereby an operator manipulating the valve stem by means of a handwheel may come to grief by the rotation thereof when the power is started as by remote control.

A further object of the invention is to arrange for limit switches which permit of distance setting so that they may be readily adjusted to function at precisely the right point with relation to the movement of the valve gate in either opening or closing directions or in both, and also to provide for limit switch means which are responsive to limited valve seating pressure at the closing of the valve gate.

Further objects are to simplify the construction and operation of the parts of the device of this invention to increase its efficiency and dependability.

In view of the foregoing objects one form of the invention provides in effect an operating extension for the valve stem or spindle, around and along which extension there are built the component mechanisms constituting the power drive and control unit.

More specifically this extension is in the form of a tubular member or adaptor sleeve arrangement which is co-axially rotatable together with an operating nut, the rotation of which nut in hand-operated units normally effects the raising or lowering of the valve spindle. This tubular extension forms an essential and important part of the motor drive mechanism, is located substantially centrally therein, and it makes possible a simple, direct and effective structural and functional association therewith of the various important component mechanisms of the motor drive and control unit, namely power transmitting elements, limit switch mechanisms, a clutch and clutch operating means. This permits the attachment at the top thereof of the conventional hand-wheel operable to rotate the valve stem directly without the intermediary of any gearing.

One feature is the enclosure of the combination of mechanism constituting the motor drive and control, within a housing capable of simple attachment to the valve yoke and in a manner not to interfere with or to change the manual operation of the valve. According to this feature it is possible by virtue of the adaptor sleeve inside for the motor unit to be fitted and attached to a standard valve yoke as well as to the standard operating nut of a conventional hand-operated valve unit. That is to say, the control unit of this invention is in effect a self-contained attachment which can be interposed between the operating nut and the handwheel of a standard manually operated valve unit. The addition of the motor drive- and control-attachment despite its vertically mounting arrangement of the component mechanisms requires no additional headroom but rather offers, due to this vertical expanse, a vertical space or housing i. e. the interior of the tubular extension member into which and out of which the upper portion of the stem or spindle may move as the valve is being operated.

Other features of advantage arise from the functioning of the parts associated with the clutch and clutch-operating means, and more particularly from the provision of automatic means for positively declutching the hand-operated parts whenever power is started.

Among the advantages there is to be noted that all parts of the power drive mechanisms are rendered non-functional when the mechanism is set for manual operation. That is to say, due to the direct rotation from the handwheel the valve, although manually operated, can thus be opened or closed with relatively great speed.

Other features of advantage reside in details of construction of the switch operating mechanisms, and particularly in those which make for simplicity and sensitiveness of their adjustment, permit their combination for precision of operation, and their accessibility.

According to a preferred form of the invention, the tubular adaptor member which forms the important operating extension for the valve spindle, can be fitted to the operating nut for the spindle, and it carries a worm gear meshing with a worm slidable longitudinally on a motor driven shaft against spring pressure. Resistance is offered by the seating of the valve gate and transmitted through the worm gear it causes the worm to be displaced longitudinally on the shaft which carries it, the displacement of the worm being effective to operate a valve closing limit switch mechanism which controls the motor circuit and which may be called an overload responsive- or torque limit switch, and which is settable to respond to a variety of valve seating pressures.

Also, the tubular adaptor member or extension is geared to and by its very rotation controls, a position determining limit switch, which is operable for distance setting of the valve gate opening movement.

According to this preferred form this power drive and control attachment also contains between the worm gear and the handwheel, and surrounding the tubular extension a clutch mechanism for selective driving connection with the valve spindle either of a motor driven train of elements or of the handwheel. The motor driven elements are normally operatively connected to the valve stem or spindle in the preferred form of the invention, in which form it is necessary to operate a de-clutching device or handle for disconnecting the motor drive to render the valve spindle or operating nut operable through the handwheel. Preferably, the declutching device once it is engaged, stays locked until it is automatically released by the starting of the power-drive. The arrangement of the limit switches is such that their potential functioning relative to the predetermined closing and opening limits is not affected by periods of hand operation.

The preferred embodiment of a power-drive attachment according to this invention also provides for a suitably shaped housing for the component mechanisms just mentioned. A substantially transverse septum in the housing provides an upper oil-tight chamber for the worm drive, clutch and related mechanism; and a substantially lower chamber which houses the limit switch mechanisms and is accessible through a lateral covered opening.

The invention possesses other objects and features of advantage, some of which, with the foregoing, will be set forth in the following description. In the accompanying drawings, for the purpose of example there has been illustrated the best embodiment of the invention now known, but such embodiment is to be regarded as typical only of many possible embodiments and the invention is not to be limited thereto.

Figure 1 is a perspective view of the entire valve structure and control mechanism assembled.

Figure 4 is an elevational sectional view of the motor drive and control mechanism.

Figure 5 is an enlarged detail plan view of the torque limit switch.

Figure 6 is a side view of the box which houses the limit switch mechanisms with cover removed therefrom, as taken along line 6—6 of Figure 4.

Figure 7 is a detail side view of the clutch locking mechanism.

Figure 8 is a cross-sectional view taken along the line 8—8 in Figure 7.

Figure 9 is a perspective detail view of the clutch locking mechanism.

Figure 10 is a perspective detail view of torque limit switch.

Figure 11 is a side view with parts drawn apart to illustrate the adaptation of the motor drive- and control-unit to the standard parts of a hand operated valve unit.

Figure 3:
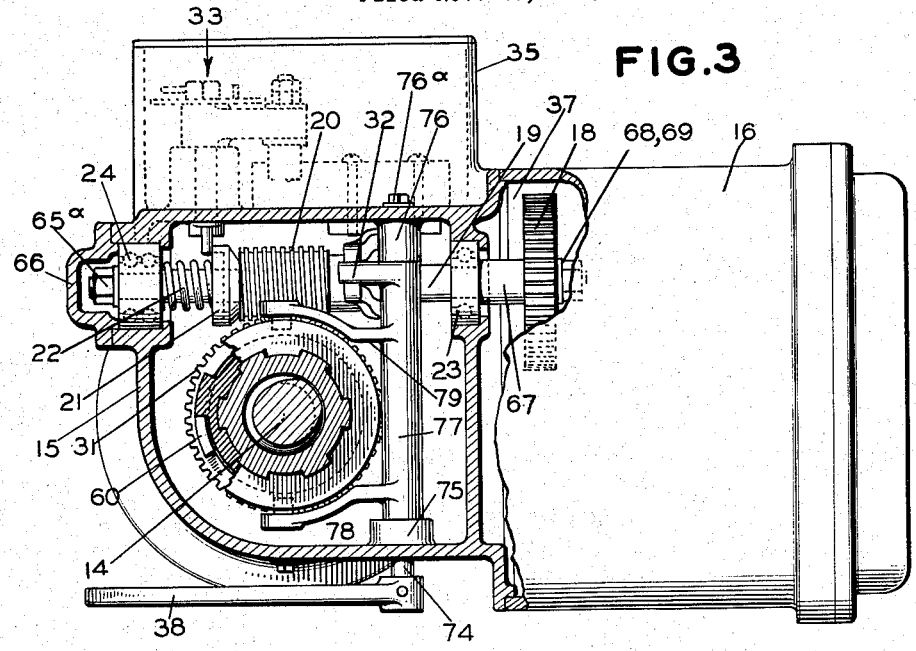
Figure 3 is a partial cross-sectional view taken through Figure 2.

The invention is applicable to valves which are of a size and importance making them desirable to be motor operated because it is generally too difficult to operate them manually. Such a valve is shown with 11 indicating its casing; 12 its yoke formed with a top flange 12a; 13 its gate or disc; and 14 its threaded reciprocating valve stem or spindle for opening and closing the valve gate 13.

To such an apparatus, this invention involves the addition of a motor drive mechanism which comprises a casing or housing 15 attachable by means of a bottom flange 15a and screw bolts 15b to the valve yoke 12. From the housing is supported a motor 16 in a suitable electrical circuit. The motor, through meshing speed reducing gears 17 and 18, drives a shaft 19. This shaft has a worm 20 mounted for rotation therewith but for sliding or reciprocating movement thereon, such as by splining. Associated with the worm 20, is a collar 21 movable therewith, and normally pressing upon said collar is a spring 22 preferably surrounding shaft 19. The shaft is rotationally journaled in bearings 23 and 24 arranged to withstand thrust exerted thereon by the shaft. From casing 15 there extends a handwheel 27 for the manual operation of the valve spindle in a manner hereinafter described.

The housing 15 for the driving mechanism is divided by a partition or septum 28 shown as integrally cast with the housing whereby there is formed an upper chamber 29 and a lower chamber 30. The upper chamber 29 is provided to house a worm drive 31 for the actuation of the valve spindle 14, and will be described in detail along with certain de-clutching mechanism 32. The chamber 29 housing these mechanisms is adapted for holding an oil bath in which they may function substantially without requiring attention. Consequently, this chamber is properly sealed with oil-tight seals wherever necessary.

The lower chamber 30 substantially houses a plurality of limit switch mechanisms. One is an overload responsive and preferably torque operated switch 33, hereinafter to be called the torque limit switch, and which serves to prevent the motor drive mechanism from remaining effective after the valve gate has seated or closed to the proper extent or with the proper pressure. Another is the limit switch mechanism 34, hereinafter called a timed distance or travel-limit switch mechanism because it is permanently geared for rotation with the rotation of the valve spindle, and it serves to render the valve gate opening action of the drive mechanism ineffective when the valve gate has reached the desired open position.

The housing 15 is formed with a lateral extension 35 through the open end of which the switch mechanisms are accessible for adjustment. The housing 15 has a lateral flange and bolt connection 36 with the housing 16 of the driving motor, the motor housing when assembled with the main housing 15 forming therewith a gear chamber 37 in which the reduction gears 17 and 18 may operate. There is also provided laterally upon at the outside of the main housing 15 a de-clutching lever 38, the function of which will be hereinafter described.

The threaded valve spindle 14 is raised and lowered by the rotation of an operating nut 39 seated in the top portion of the standard valve yoke 12 as by a flange portion or collar 40 formed intermediate a lower cylindrical portion 41 and an upper cylindrical portion 42 of the operating nut and carried between ball thrust bearings 42a and 42b.

It is notable that the operating nut 39 is preferably the same which forms part of the assembly of a hand-operated valve such as normally furnished by the valve manufacturer. The motorized drive according to this invention permits the adaptation thereof to the standard operating nut 39 through the provision within the drive unit of a tubular extension or what is herein called an adaptor sleeve arrangement 43 for effecting the rotation of the operating nut 39 when the valve is to be actuated. In the following it will be seen that the adaptor sleeve arrangement 43 within this drive mechanism forming an extension of the valve stem constitutes a characteristic element of importance in view of other assemblies and relationships which it makes possible.

The adaptor sleeve arrangement 43 specifically includes a base sleeve 45 connected with the nut 39 for rotary driving engagement through a pair of keyways 44, and having rotary bearing fit in a hub portion 46 upstanding from the bottom of the housing 15, said hub having shown therein a bushing 44a. This sleeve 45 has provided upon its upper portion a thread 47 of suitable type for the purpose of operating the timed limit switch mechanism 34 hereinafter described.

The adaptor sleeve arrangement 43 furthermore includes a tubular member 48 which has a telescopic fit in the base sleeve 45 and is seated upon the top face of the nut member 42, and is connected to the base sleeve 45 for torque transmission through the keyways 44.

The tubular member 48 passes with clearance through a hub portion 49 which forms a part of the septum 28. A clutch portion 51 is rotatably seated upon the top portion of the tubular member 48, and has connected therewith as by a keyway 52 the handwheel 27 to form a rotary unit therewith. The clutch portion 51 has in its upper end portion a bushing 51a, which has a running fit upon a corresponding upper end portion of the tubular member 48. The clutch portion 51 consists of an upper cylindrical body portion 53 and a lower enlarged portion or skirt 54 which has depending therefrom a lug 55. The clutch portion 51 is therefore formed with a shoulder 56 onto which fits a corresponding annular portion 57 of a cover member 58 topping the housing 15 and attachable thereto.

A worm gear 59 meshes with the worm 20 and is loosely and rotatably seated upon the tubular member 48. The lower hub face of the worm gear 59 bears upon the top face of the hub or bearing 49, and at the top it is provided with a lug 60.

A ring or spacer 61 fits over a reduced portion of the tubular member 48, and it is interposed between shoulders of the tubular member 48 and of the clutch portion 51 respectively. Another ring 61a is interposed between the top face of the worm gear 59 and a splined portion 62 of the tubular member 48.

Interposed between the upper clutch portion 51 and the worm gear 59 is a clutch collar 63 which has a splined engagement with the corresponding portion 62 of the tubular member 48. This clutch collar 63 has extending from the top and from the bottom thereof a lug 63a and a lug 64 respectively, which lugs are adapted for potential inter-engagement with the corresponding lugs 55 and 60 respectively, depending upon whether the clutch collar 63 is moved into an upwardly or downwardly shifted position.

In this way a pickup or intermittent connecting arrangement is provided between worm gear 59 and clutch collar 63. This pickup or lost motion arrangement is used to permit the motor and its shaft 19 to gather some momentum before the parts or lugs engage. For instance, with clutch collar 63 shifted downwardly, a lug 60 on the worm gear 59 engages lower lug 64 on the clutch collar 63 to assume the load of rotating the operating nut 39 or valve spindle 14 to lift the valve gate. The slap or hammer blow of the lug 60 which has gathered momentum through substantially one revolution against lug 64 gives a blow to the valve spindle 14 which slides in unseating the valve gate in the event that the latter tends to stick shut.

When the clutch collar 63 is shifted upwardly the upper lug 63a thereof will engage the lug 55 of the upper clutch portion 51 in substantially the same manner and thereby effect operative engagement of the handwheel 27 with the tubular member 48 of the adaptor sleeve arrangement 43, so that then manual operation of the handwheel 27 will rotate the nut 39 and consequently raise or lower the valve spindle 14 to open or close the valve.

A compression spring 65 is interposed between the clutch collar 63 and the clutch portion 51 and surrounded by the skirt 54 thereof. This spring 65 is therefore normally effective to urge the clutch collar 63 into engagement with the worm gear 59, a driving connection thus being established between the worm drive 20, 59 and the tubular member 48 which operates the valve spindle 14, with the handwheel 27 and clutch portion 51 then being idle.

When the valve-gate is being closed by power, as soon as it seats, the torque on the operating nut 39 is increased and it reacts through sleeve 45 and tubular member 48 of the adaptor sleeve arrangement 43 upon the worm gear 59 and then upon the worm 20. But when this torque becomes greater than the pressure exerted by spring 22 upon the worm 20 through worm collar 21, then the worm 20 is caused to slide longitudinally upon shaft 19 in a left-hand direction (Fig. 3) while rotating therewith, to operate the torque limit switch 33 hereinafter described, whereby the motor circuit is opened. Upon reversal of the motor, spring 22 returns the worm 20 to initial position shown in Fig. 3.

The shaft 19 of the worm drive journaled in ball bearings 23 and 24 mounted in the side walls of the housing 15 has at its free end a head or nut 65a covered by a flanged closure cap 66 suitably fixed to housing 15.

The driven end of the worm shaft 19 carries the gear 18 spaced from the bearing 23 as by spacing sleeve 67 and held in place by nut and washer 68, 69. The gear has meshing with it the pinion 17 through which it receives driving impulse from the shaft 70 of a motor 71 housed in the casing 16.

The worm shaft 19 also is provided with a cam member 73 to rotate with the shaft and located thereon between the worm 20 and the bearing 23. This cam member 73 has cooperative relation with a de-clutching device presently to be described. The de-clutching device is manipulated when the setting of the valve actuating mechanism is to be changed from normal power operation to manual operation of the valve.

The de-clutching device comprises a horizontal rocking shaft 74 journaled in hubs 75 and 76 in the side walls of the upper housing chamber 29, and extending above and transversely of the worm shaft 19. The rocking shaft 74 has an end portion extending through and protruding from the outside of the wall, to which end portion it has fixed the operating hand lever or de-clutching lever 38. At the other end of the rocking shaft is provided a plug 76a as an end closure for the journal 76. The shaft 74 has a tube portion 77 surrounding it and fixed thereto and dimensioned to extend between and from face to face of the hubs 75 and 76. The tube portion 77 has a pair of arms 78 and 79 forming a clutch actuating yoke to embrace the clutch collar 63, the yoke arms having at their ends cylindrical protrusions or bosses 80 and 81 respectively extending inwardly towards each other and adapted to lodge in a circular groove 82 of the clutch collar 63. Consequently, the upward throw of the hand lever 38 against the pressure of the compression spring 65 and the attendant upward shifting of the clutch collar 63 will cause the operative connection between the valve spindle 14 and the worm gear 59 to be interrupted while causing the upper clutch portion 51 together with the handwheel 27 to be engaged into operative connection with the valve spindle.

As a safety measure and as a matter of convenience it is desirable on the one hand to have the de-clutching lever 38 locked in de-clutching position when set for manual operation of the valve spindle, and on the other hand to have the lever 38 together with the clutch collar 63 restore itself automatically to power operated position in response to the turning on of the power for the driving motor and the worm gear drive, so that consequently, the handwheel is restored to its idle or out of function condition. In this way there is avoided the risk which might arise through the inadvertent switching on of the power while the handwheel is being manipulated.

To this end the de-clutching device also includes a locking mechanism and means for automatically causing the unlocking of the de-clutching lever 38 under certain operating conditions, such locking and unlocking or escapement mechanism being shown particularly in Figures 7, 8 and 9, near the worm shaft 19, with a substantially horizontally extending lug 83 integral with the tube portion 77 arranged to cooperate with two upstanding locking levers 84 and 85 having a common pivot at 86 located below and parallel to the worm shaft mounted in a bracket 86a fastened upon wall portion 92 of septum 28 by means of screws 86b and 86c. The locking levers are substantially symmetrically curved and extend upwardly from their pivot 86 to embrace the worm shaft 19 at the point where it carries the cam member 73. The free end portion of the locking levers 84 and 85 are drawn together at a point above the worm shaft by a tension spring 87, and are formed with recesses 88 and 89 of differentiated depth, 88 being the shallower one with respect to recess 89.

These locking levers or jaws may spread or close as indicated in Fig. 8, and consequently, they may either hold or release the lug 83 and thereby either lock or unlock the de-clutching levers. That is to say, with the levers or jaws in closed position as indicated in dotted lines in Fig. 8 the lug 83 is held in confinement in the recesses 88 and 89, having shoulders 88a and 89a respectively and firmly seated therein due to pressure from the compression spring 65 of the clutch device. The lug then rests upon the shoulder 88a of the shallower recess. However, the rotation of the cam member 73 may urge the jaws 84, 85 apart and thereby release the lug 83 permitting the same to drop and enter between the opening jaws (see Fig. 8), and the clutch collar 63 to enter into manual operation engagement with the worm gear 59.

The differentiation noted in the depth of the recesses 88, 89, is necessary in that the rotation of the cam member 73 will first cause the shoulder 88a to give way to catch upon the side of lug 83, permitting the lug 83 to drop upon the shoulder 89a of recess 89. Continued rotation of the cam member 83 will subsequently also urge the locking lever 85 out of the way whereupon the lug 83 is free to drop.

To this motor drive mechanism there is added a plurality of limit switch mechanisms controlling the motor circuit, one of which the torque limit switch 33, serves to prevent the motor drive mechanism from remaining effective after the valve-gate has seated or closed to the proper extent or with the proper pressure, and another of which, the distance limit switch 34, serves to render the valve-gate opening action of the drive mechanism ineffective when the valve-gate has reached the desired open position.

The limit switch for rendering the motor drive mechanism ineffective upon the gate reaching the desired closed position is preferably torque-operated and comprises a rock shaft 91 extending through a vertical portion 92 of the intermediate wall or septum 28 of housing 15 and transversely relative to worm shaft 19.

At the end of rock shaft 91 adjacent to shaft 19, there is secured thereto a rock arm or lever 93, while adjustably secured to the other end of the rock-shaft 91, is provided another rock arm 94 which is a contact arm since it carries an electric contact maker and breaker 95 insulated against the rock arm 94 for closing the motor circuit, when it contacts with a co-acting stationary contact plate 96, which is the normal position of the contacts, namely, circuit closing. Longitudinal sliding movement of worm 20 on worm shaft 19 causes worm-collar 21 to engage lever or rock arm 93 and thus to rock or partially rotate rock shaft 91 which in turn causes rotational movement of rock arm 94 and this causes the contact maker and breaker 95 carried thereon to move away from fixed contact plate 96 to open the motor circuit and stop further movement of the parts. Seating pressure of the valve-gate on its seat can be adjusted by varying the normal distance between the rock arm 93 and worm-collar 21. That is, the nearer rock arm 93 is to worm-collar 21, the less the worm-collar needs to move to engage the rock arm 93 and consequently the quicker the rock arm 94 breaks the motor circuit. Conversely, the farther rock arm 93 is adjusted from the normal position of the worm-collar 21, the longer it will be after the valve seating torque on spindle 14 adaptor sleeve arrangement 43 and worm gear 59 causes worm 20 to move into a position to turn the rock arm 93 and open the motor circuit.

Since rock arm 93 is fixed on rock shaft 91, this adjusting is done by rotationally varying the position of rock arm 94 with respect to rockshaft 91 and thus to rock arm 93. That is, the degree of arc between the rock arms 93 and 94 about their common axis (rock shaft 91) is varied. To this end of rendering the motor drive ineffective when the valve-gate has reached a predetermined seating pressure, there is provided a bolt 97 for loosening or tightening the annular end or split hub portion 97a of the switch rock arm 94 which encircles rock shaft 91 so that rock shaft 91 with rock arm 93 fixed thereto may be swung to any adjusted position in the plane of its rotation, and so that the rock arm 93 extends the proper or desired distance from the worm-collar 21. Rock shaft 91 is journaled in a flanged bearing sleeve 98 threaded into a hub 99 extending from a vertical wall portion 92 of the septum or dividing wall 28 of housing 15. The contact bearing rock arm 94 is normally spring pressed into contact closing position by means of a coil spring 100, one end 101 of which bears against the side wall of the housing extension 35, while the other end 102 bears upon the rock arm 94.

The rock shaft 91 of the limit torque switch carries at its outer end an indicator dial or sector plate 103, the position of which is fixed relative to the rock arm 94 through a pin 104 fixed in the split hub portion 97a of the switch rock arm 94. The rock shaft 91 carries at its free end a nut 105 from which laterally extends a pointer 106 for pointing on the indicator dial to legends such as "H" and "L" indicating "heavy" or "light" with respect to the valve seating pressure.

The nut 105 with its pointer 106 is normally rigidly tightened upon the rock shaft 91. However, in order to set the switch mechanism to make it responsive to a certain valve seating pressure the rock arm 94 by loosening the bolt 97 can be rendered movable upon the rock shaft 91 and together with the indicator dial 103 it can be angularly adjusted relative to the pointer 106 that is relative to the other rock arm 93 respectively. After thus positioning the pointer 106 relative to the indicator dial 103, the bolt 97 may again be tightened in order to fix the parts in adjusted position.

It will be noted that the pin 104 also acts as a limit which determines the maximum valve seating pressure when the pointer 106 is rotated far enough to engage upon the pin 104.

It is also noted that the contact making and breaking member 95 upon rock arm 94 has a flexible current conducting connection 107 with a stationary terminal 108 upon an insulator plate 109 which insulator plate also carries the corresponding other terminal in the form of the contact plate 96.

There are provided oil seals at suitable places (see Fig. 4) to prevent oil leakage from the chamber 29 of the housing 15, and they are found at 110 surrounding the tubular member 48; at 111 surrounding the rock shaft 91; at 112 surrounding the upper clutch portion 51; at 113 surrounding the top of the tubular adaptor member 48. There is also shown in the wall of the housing 15 an oil fill opening, closed with a plug 114, and an oil test opening, closed with a plug 115.

The torque responsive limit switch mechanism just described is used in this embodiment of my invention for controlling the valve-gate seating or closing operations to take place with the proper pressure and to the proper extent. So there will now be described the second switch mechanism and which is used in this embodiment for controlling the proper and desired extent of the valve-gate opening, and which is identical with the switch mechanism 34 which was previously termed the timed distance- or travel-limit switch mechanism.

This second or timed switch arrangement is located substantially adjacent to the first or over load responsive switch and also located within the extension 35 of the main housing 15 and so as to be readily accessible from the outside.

In general, this gate opening controlling limit switch operates through a gear connection which it has with the spindle 14, to render the motor drive ineffective or inoperative when the valve stem 14 shall have made a predetermined movement. To that end this limit switch is permanently geared up with the spiral thread 47 upon the adaptor base sleeve 45.

This second or timed switch arrangement is located substantially adjacent to the first or overload switch and also located within the extension 35 of the main housing 15 and so as to be readily accessible from the outside.

The geared or timed switch mechanism consists of a quick-acting switch 116, which is of the type that will break a circuit while engaged and close the circuit when released. In this way it is controlled by a switch timing device which is geared up to the rotation of the spindle 14. The momentary switch will be effective to open a circuit controlling the driving motor when engaged by the timing device but close automatically when released. Breaking this circuit will stop the motor.

This timing device may be in duplex form symmetrically arranged; that is to say, it may be associated with a second such quick-acting switch 117, the use of which can be optional instead of the overload switch, and may be used wherever it is desired to have both limits of operation or movements controlled in a travel distance fashion by timed limit switches.

The two quick-acting switches 116 and 117 are mounted opposite each other in a suitable manner within the extension 35 of the main housing.

The switch timing device comprises a threaded spindle switch actuator 118 extending adjacent to and transversely of the main valve spindle 14, and journaled as at 119 and 120 respectively in the side walls of the housing extension 35. The spindle 118 has fixed at its center portion a spiral gear 121 adapted to mesh with the thread 47 of the adaptor sleeve base 45.

Upon the spindle 118 are provided a pair of adjustable disc members 122 and 123 to function as actuators for the respective quick-acting switch 116 and/or 117. Each of the disc members 122 and 123 has an internal thread that fits over the thread of the spindle so that by rotation of the discs upon the spindle 118 each disc can be adjusted to a desired position upon the spindle and thus to a desired space relationship with its associated quick-acting switch 116 and 117 respectively.

Each of the disc members or switch actuators 122 and 123 has circumferential teeth which serve to maintain them in their adjusted timed relationship with respect to the switches and the main valve spindle. That is to say, the switch actuators are fixed in their adjusted position by means of a removable locking bar 124 shown to extend from side to side of the housing extension 35, which locking bar is adapted to engage in any of the teeth of the disc members 122 and 123. The locking bar is removable for the purpose of adjusting the switch actuators, as indicated by the slot and bolt connections 125, 126. With the locking bar 124 operatively engaged, the rotation of the spindle 118 through the operation of the spiral gear 121, will cause the disc members 122, 123 to travel either towards, or away from their respective quick-acting switches 116 and 117 in timing relationship with the rotation of the main valve spindle 14. If the driving rotation is, for instance, such that the switch actuator spindle 118 will cause the disc member 123 to move towards the switch 116, it will eventually engage and open the switch 116 and cause the cutting of the motor current. Restarting of the motor and rotation of the switch actuator spindle 118 in the opposite direction will retract the disc from the switch 116 and permit the same to return to circuit closing position so as to be conditioned for another operation. The other switch 117, of course, may be operated in a similar fashion. In this way a simple, convenient and expeditious fine adjustment of the timing relationship is made possible. There is provided a cover 125 to close the open end of the housing extension 35, through which access to the switch devices can be had.

Operation

To begin with, the valve may be assumed to be in open position with the valve-gate 13 raised off its seat, further assuming the clutch mechanism or clutch collar 63 to be conditioned so that the power driving elements have driving engagement with the adaptor sleeve arrangement 43.

In order to close the valve by power, the motor circuit may then be closed by some initiating switch or push button from a control station, whereupon motion of the motor through spur gears 17, 18, wormshaft 19, worm 20, and worm gear 59 will rotate the tubular adaptor member 48 and adaptor base sleeve 45 respectively, to effect the lowering of the valve spindle 14.

However, during the starting phase the motor is allowed to gather momentum since it yet has no load until worm gear 59 makes substantially one revolution before lug 60 thereon engages lug 64 on clutch collar 63 to initiate the adaptor sleeve's rotation by a hammer blow that is transmitted through the sleeve to the valve stem 14 which is lowered by the rotation of the sleeve.

Continued rotation of the motor driven parts, including the sleeve, continues the descent of the valve spindle with its valve-gate 13 toward its seat until the valve-gate actually seats to a predetermined pressure, whereupon the resistance offered by this seating is transmitted in the form of increased torque through the spindle 14, the adaptor sleeve arrangement 43, and the worm gear 59 to the worm 20, which results in the longitudinal or sliding movement of the worm 20 and its worm collar 21 upon shaft 19 against the pressure of spring 22.

This motion of the worm 20 and its collar causes functioning of the torque limit switch mechanism as follows: The collar 21 engages rock arm 93 and rocks it whereby rock-shaft 91 is also rotated a fraction and in turn rocks or moves contact rock arm 94, whereupon contact maker 95 is pulled away from stationary contact plate or terminal 96, causing the opening of the motor circuit with the consequent stoppage of the motor and its associated chain of driving elements.

The adjustment of the torque operated switch mechanism to function when the desired seating relation between valve-gate and valve seat is reached, has already been described.

Assuming now the valve is closed with its valve-gate firmly engaged upon its seat. In order to open the valve-gate, the motor circuit is closed by a motor reversing switch as from the control station, whereupon the motor operates in the reverse direction from that of its valve closing operation and through spur gears 17, 18 rotates the worm shaft 19 and its worm 20 which in turn rotates worm gear 59 through substantially a revolution thereof before its lug 60 engages lug 64 on clutch collar 63 with a hammer blow which is transmitted through valve spindle 14 and serves to unseat the valve-gate 13 even though it tends to stick therein. Continued rotation of the parts raises the stem and its valve-gate to be stopped when the desired or predetermined open position is reached by the following operation of the geared distance or travel limit switch mechanism 34.

Rotation of the adaptor base sleeve 45 through its spiral threads 47, and through spiral gear 121 causes the switch actuator spindle 118 to rotate in order to move one of the two switch actuator discs 122, 123, whichever should be selected for this operation, to travel along the actuator spindle 118, as it is guided along the locking bar 124. If for instance switch actuator disc 123 should have been set for a desired limit switch operation, leaving the other actuator disc 122 to idle, the rotation of the valve spindle 14 and the consequent rotation of the actuator spindle 118 derived therefrom through permanent gearing connection, will cause the actuator disc 123 to move along the actuator spindle 118 until its engagement upon the quick-acting switch 116 causes the instantaneous opening thereof and thereby the stopping of the motor and of all further motion of the parts connected therewith. The quick-acting switch 116 is then held open by the actuator disc 123 until the renewed closing of the gate-valve causes the return of the actuator disc 123 along the actuator spindle 118 and thereby the release of the switch 123 enabling the latter to restore itself to closed position so that it will then be conditioned for another travel limit operation.

The adjustment of this geared distance- or travel limit switch has already been described.

Figure 2:
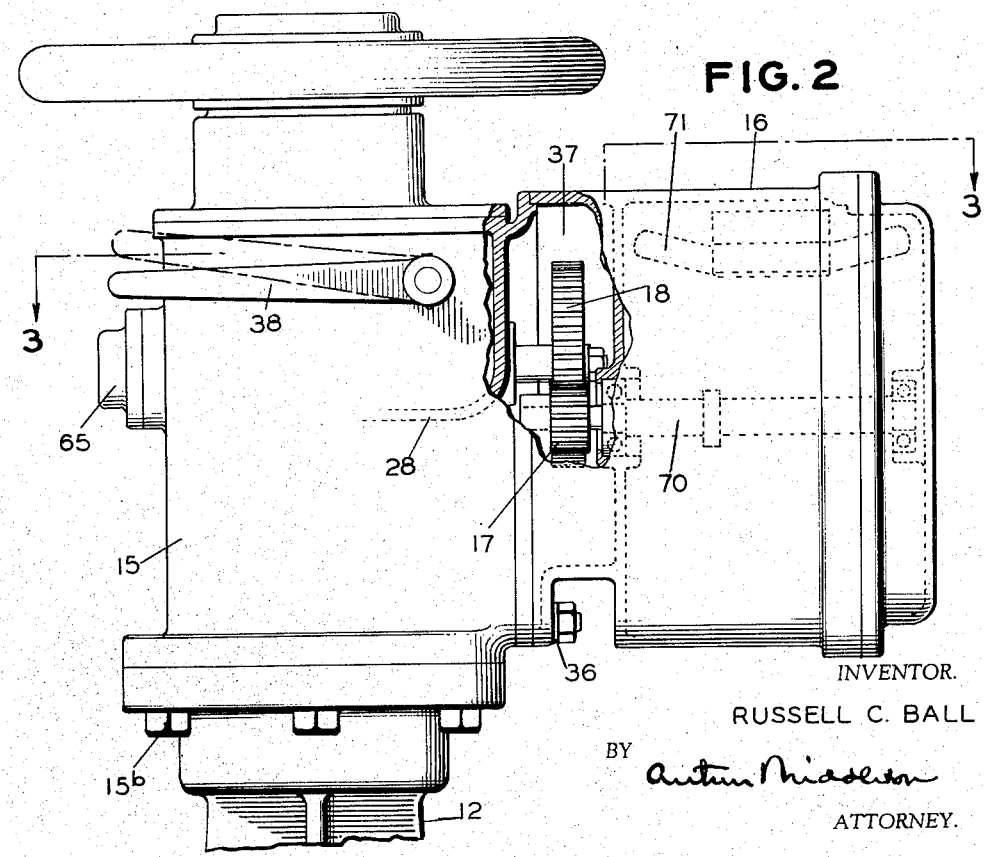
Figure 2 is a side view upon the housing of the motor drive and control mechanism, with wall portions broken away.

The operation of the clutch device is described, as follows: It is understood that while the power drive is connected the lug 83 of the locking device is lodged in its lower position between the locking levers 84, 85 while the clutch spring 65 holds the clutch collar 63 pressed into driving engagement with the worm gear 59. In order to disengage the power drive and to establish driving connection between the adaptor sleeve arrangement 43 and the handwheel 27 the clutch lever 38 is lifted by hand (see Fig. 2) from its lower position (shown in full lines) into its upper position (shown in dot and dash) with the result that the clutch collar 63 is lifted out of engagement with the worm-gear 59 against the pressure of spring 65, and into engagement with the upper clutch portion 51 of the locking device, with the result that simultaneously the lug 83 is lifted into the position shown in dotted lines in Fig. 8, in which it is held locked due to the spring 87 drawing the locking levers 84 and 85 together.

It is clear that now the valve spindle 14 can be operated by the rotation of the handwheel being directly connected to the adaptor tube member 48 and thereby to the operating nut 39.

If now a remote control impulse be given to the power drive housing the motor and its driving mechanism to operate, then the rotation of the worm shaft 19 will cause the cam 73 thereon to spread the locking levers 84, 85 apart a distance sufficient to release or free the lug 83 from its locked position, thus permitting clutch spring 65 to press the clutch collar 63 out of engagement with the upper clutch portion 51 and into engagement with the worm gear 59. In this way a power control impulse will automatically change the driving connections from hand to power operation, thus precluding the possibility of having the power drive rotate the handwheel while the same is being manipulated by an operator.

The change from power to manual operation, and vice versa, of the valve-gate is effected through the clutch device described above. That is to say, the clutch device can be manipulated to disconnect the power drive while establishing handwheel operation, but it will at all times be automatically controlled to de-clutch the hand wheel and to re-engage the power drive in response to a power drive impulse given from the control station, with the result that at no time will there be an overlapping or interference of power with manual operation.

Fig. 11 illustrates important feature which lies in the procedure of converting a hand-operated standard valve unit into one with a power drive just described. This valve unit can be furnished by the valve manufacturer with the operating nut 39 retained in the top portion of the valve yoke 12 as between the ball thrust bearings 42a and 42b and by a retaining top or cover flange or annulus 127 (shown in dot and dash) and by the bolts 15b. The cylindrical portion 42 of operating nut 39 protrudes far enough to have fitted thereon and fixed thereto a handwheel (also shown in dot and dash).

Now, in order to attach the aforedescribed novel construction of a power drive mechanism or unit to the valve yoke, the bolts 15b are undone and the flange 127 as well as the handwheel removed. Now the power drive unit can be adjusted to the top of the valve yoke 12 by having the adaptor sleeve 45 fit over and onto the protruding portion 42 and its keyways of the operating nut 39, and by having threaded holes provided in the lower base flange 15a of the power drive unit match with corresponding bolt holes in the top flange 12a of the valve yoke, whereupon the bolts 15b are used to fix the two respective flanges 12a and 15a together. The handwheel 27 may be attached to the top of power drive unit as shown.

It will be seen that the power drive unit or attachment as designed can be readily manufactured independently of the valve unit if some simple measurements of the top portion of the yoke of the outside of the operating nut 39 are known, and that in this way the operating nut 39 can be furnished as properly fitted to the spindle by the valve manufacturer and need not be made in conjunction with the power drive unit and separate from the manufacturing process of the spindle.

In other words, it will be seen from the foregoing that this invention eliminates any stem operating nuts within the control mechanism proper, making the same a substantially independent or self-contained unit or attachment. This eliminates such disadvantages as the necessity of furnishing the nut tapping in exact accordance with the valve manufacturers' standard specifications of threading, or problems of tool standardizations to meet various thread sizes as specified by the manufacturers, or the loaning of gauges from these manufacturers to obtain accurate threading.

Furthermore, due to the adaptor sleeve arrangement of this invention, the loads imposed upon valve stems, due to pipe line pressures, are not transmitted to the walls of the control casing or power drive housing, but are confined to the lower flange portion of the housing, while all interior parts and the walls of the power drive unit are kept free from the axial thrust of the valve spindle. This eliminates the provision of large bearings, with consequent reduction in cost and weight of the power drive unit, and it permits the design and manufacture of the unit to be carried out with substantially sole regard to its specific functions.

While thus a simple assembly of the power drive unit with the valve yoke is attained, the problem of thread contours remains with the valve manufacturers as provided for in their original equipment.

It is also noted that with the present arrangement of an adaptor sleeve and a handwheel, there is no reduction gearing between the handwheel 27 and the operating nut 39, so that in the event the power drive mechanism were damaged, the motor-driven mechanism can be released by de-clutching and manual operation be effected independent of any part of the power drive.

I claim:

1. A power drive for a valve actuating spindle, which comprises a housing, a tubular member rotatably mounted in said housing and adapted to surround the spindle for operating the same when rotated, a drive mechanism within said housing and a motor therefor, and which drive mechanism is adapted for selective driving connection with said tubular member, hand-operated means extending from said housing and also adapted for selective driving connection with said tubular member, a clutch mechanism also within said housing and which is alternately operable to connect either said driving mechanism or said hand-operated means with said tubular member, pressure means for normally urging said clutch mechanism out of hand-operated driving connection and into power-operated driving connection, clutch operating means for actively engaging said hand-operated drive means against the pressure of said pressure means, means for locking said clutch operating means when so engaged, and means responsive to the operation of the motor driven mechanism for automatically unlocking the same to effect thereby the release of the hand-operated driving means and the automatic re-engagement of the motor driven means with said tubular member.

2. A power drive for a valve actuating spindle adapted for alternate power and manual operation, which comprises a rotary member adapted to surround the spindle for axially moving the same when rotated, a power-driven mechanism adapted for selective driving connection with said rotary member, a clutch mechanism which is alternately operable to connect either said driving mechanism or said manually operated means with said rotary member, clutch detent mechanism operable and effective to maintain and secure the active engagement of the manually operated means, and means responsive to the operation of the power-driven mechanism for automatically rendering ineffective said clutch detent mechanism to effect thereby the release of the hand-operated driving means and the automatic operative engagement of the power-driven means with said rotary member.

3. A power drive for a valve actuating spindle, adapted for alternate power and manual operation, which comprises a rotary substantially tubular member adapted to surround the spindle and by its rotation to serve for axially moving the same when rotated, a power-driven mechanism adapted for selective driving connection with said rotary member, which mechanism comprises a worm gear surrounding said rotary member and rotatable thereon, a wormshaft therefor; manually operated torque transmitting means such as a handwheel also loosely surrounding said rotary member and adapted for selective driving connection therewith; a clutch collar surrounding said rotary member intermediate said power-driven mechanism and said manually operated means and having axially sliding engagement with said rotary member as through splining, which clutch collar is adapted by way of a corresponding shifting thereof to engage either said power-driven mechanism or said manually operated means respectively, detent mechanism operable and effective to maintain and secure the active engagement of the manually operated means, and means responsive to the rotation of said wormshaft for automatically rendering ineffective said detent mechanism to effect thereby the release of the hand-operated driving means from said clutch collar and to effect automatic operative engagement of the power-driven means with said clutch collar when said wormshaft rotates.

4. A power drive for a valve actuating spindle, adapted for alternate power and manual operation, which comprises a rotary member adapted to surround the spindle for axially moving the same when rotated; a power-driven mechanism adapted for selective driving connection with said rotary member, which mechanism comprises a worm drive, including a wormshaft, for rotating said rotary member; manually operated torque transmitting means also adapted for selective driving connection with said rotary member; clutch means interposed between said power-driven mechanism and said manually operated means and capable of engaging alternately either the one or the other; detent mechanism operable and effective to maintain and secure the active engagement of the manually operated means; and means responsive to the rotation of said wormshaft for automatically rendering ineffective said detent mechanism to effect thereby the release of the hand-operated driving means from said clutch means and for effecting the automatic operative engagement of the power-driven means with said clutch means, incident to the rotation of said wormshaft.

5. In a power drive for a valve actuating spindle, adapted for alternate power and manual operation, a rotary member adapted to surround the spindle for axially moving the same when rotated; a power-driven mechanism, comprising a rotary drive shaft, adapted for selective driving connection with said rotary member; manually operated means also adapted for selective driving connection with said rotary member; a rotary and axially shiftable clutch collar interposed between said power-driven mechanism and said manually operated means and capable through shifting of engaging alternately either the one or the other for driving, a movable clutch operating frame for shifting the clutch collar, pressure means normally effective to cause said clutch collar to enter into operative engagement with said power-driven mechanism, detent mechanism operable and effective to act upon said clutch operating frame to maintain and secure the active engagement of the manually operated means against the pressure of said pressure means, and trip means associated with said rotary shaft for automatically releasing said clutch operating frame from said detent mechanism to effect thereby the release of the hand-operated driving means and to effect the automatic return of the clutch collar into operative engagement with said clutch means, when said shaft rotates.

6. A valve control mechanism according to claim 5, in which the detent mechanism comprises an automatic catch for holding said clutch operating frame in the position which corresponds to the engagement of the manually operated means, and in which the trip means are in the form of a cam-member provided upon said shaft, which cam-member incident to the rotation of the shaft causes the dis-engagement of said catch and the freeing of said clutch operating frame.

7. A valve control mechanism according to claim 5, in which the clutch operating frame has a detent lug, and in which the detent mechanism comprises a pair of locking levers symmetrically arranged to substantially surround said driving shaft and with the free ends of said levers adjacent to and co-operatively associated with said detent lug, pressure means for urging the free ends of said locking levers towards each other; and in which the trip means comprise a cam-member provided upon said driving shaft, and effective incident to rotation of said shaft to swing said locking levers away from each other as against the urge of said pressure means, said locking levers having at their free ends corresponding indentations of differentiated depth in which to catch and lock said detent lug when the clutch collar has been moved into engagement with the hand-operated means, the rotation of said drive shaft being effective through the rotation of said cam-member to move both said locking levers in succession out of locking position relative to said detent lug and allowing the detent lug to enter into the space between said locking levers after it has left in successive order its respective indentations of differentiated depth, and thereby allowing said clutch collar to shift into operative engagement with said power-driven mechanism.

8. A valve control and actuating mechanism having a valve actuating spindle and a yoke structure in which the spindle operates, which mechanism comprises a housing having a base lower portion adapted for attachment to the yoke structure, a rotary member adapted to surround the spindle for axially moving the same when rotated, which member is rotatably mounted in said housing, a septum dividing said housing into an upper and a lower chamber relative to the spindle axis and relative to the yoke structure as a defining basis, and extending substantially transversely of said rotary member, a power-driven mechanism arranged in the one chamber for driving said rotary member, and a distance limit switch mechanism arranged in the other chamber for stopping said power driven mechanism at a predetermined point of spindle movement, which limit switch mechanism includes means for bringing into geared relationship said rotary member and the limit switch mechanism.

9. A valve control and actuating mechanism having a valve actuating spindle and a yoke structure in which the spindle operates, which mechanism comprises a housing having a base lower portion adapted for attachment to the yoke structure, a rotary member adapted to surround the spindle and effective to axially move the same when rotated, which member is rotatably mounted in said housing, a septum dividing said housing into an upper and a lower chamber relative to the spindle axis and relative to the yoke structure as a defining basis, and which septum extends substantially transversely of said rotary member, a power-driven mechanism arranged in the one chamber for driving said rotary member, said chamber being adapted to receive a lubricating substance therein, limit switch mechanism arranged in the other chamber for stopping said motor-driven mechanism at a predetermined point of spindle movement, and means for preventing entrance of lubricating substance from the one chamber to the other.

10. For use with a valve construction having a valve housing and a valve actuating spindle, a power drive and control mechanism for the valve actuating spindle, which comprises a housing, a rotary member adapted to surround the spindle and effective to axially move the same when rotated, which member is rotatably mounted in said housing, a septum dividing said housing substantially into an upper and a lower chamber relative to the spindle axis and relative to the valve housing as a defining basis and which septum extends substantially transversely of said rotary member, a power-driven worm gear mechanism arranged in the first mentioned chamber for driving said rotary member, and including a worm which is axially and resiliently displaceable as a result of predetermined excess thrust reaction from the spindle, an overload responsive limit switch arranged outside of although adjacent to the first mentioned chamber and arranged to be accessible substantially by way of the last mentioned chamber and having an actuator member extending into the first mentioned chamber and into cooperative relationship with said displaceable worm and thereby effective to transmit axial movement of said worm substantially proportionately to said overload responsive switch, and a distance limit switch mechanism arranged in the lower chamber and adjacent said overload responsive mechanism for stopping said motor driven mechanism at a predetermined point of spindle movement.

11. As an adaptation to a valve construction having a valve spindle, a yoke structure in which the spindle operates, and an actuating nut engaging the spindle and rotatably disposed in the top portion of the yoke for axially moving the spindle when rotated relative to the yoke, which actuating nut has a relatively exposed portion protruding axially and outwardly from the yoke top and adapted for the association therewith of torque imparting means for effecting the rotation of the nut, a housed power drive unit attachable in a self-sustained manner to the yoke top for driving relationship with the nut, and having a recessed portion adapted to receive therein said exposed nut portion for torque transmitting cooperative engagement between the power drive and said nut portion, which recessed portion is also adapted and arranged to permit said spindle to pass therethrough when the unit is attached.

12. As an adaptation to a valve construction having a valve spindle, a yoke structure in which the spindle operates, and an actuating nut engaging the spindle and rotatably seated in the top portion of the yoke in a manner to be outwardly removable therefrom and otherwise disposed for axially moving the spindle when rotated relative to the yoke, which actuating nut has a relatively exposed portion protruding axially and outwardly from the yoke top and adapted for the association therewith of torque imparting means for effecting the rotation of the nut; a housed power drive unit attachable in a self-sustained manner to the yoke top for driving relationship with the nut, and if so attached permitting the actuating nut to be rotated while axially confined between the power drive and the yoke top portion, said power drive unit having a recessed portion adapted to receive therein said exposed nut portion for torque transmitting cooperative engagement between the power drive and said nut portion, which recessed portion is also adapted and arranged to permit said spindle to pass therethrough.

13. As an adaptation to a valve construction having a valve spindle, a yoke structure in which the spindle operates, which yoke structure has a top face whereby it is serviceable as a supporting base for the power drive hereinafter mentioned, and having an actuating nut engaging the spindle and rotatably disposed in the top portion of the yoke for axially moving the spindle, when rotated relative to the yoke, which actuating nut has a relatively exposed portion protruding axially and outwardly from said top face of the yoke and adapted for the association therewith of torque imparting means for effecting the rotation of the nut; a housed power drive unit attachable to said top face, and having a recessed portion adapted to receive therein said protruding nut portion for torque transmitting cooperative relationship between the power drive and said nut portion, which attachable power drive unit is designed in a fashion whereby it substantially and in a compact form encircles said exposed nut portion and said spindle respectively, and whereby it rises from said top face substantially in the direction of axial continuation of said yoke structure.

14. In combination a spindle operated valve construction having a yoke structure in which the spindle operates and an actuating nut engaging the spindle and rotatably disposed in the top portion of the yoke to serve in effecting axial movement of the spindle when rotated relative to the yoke, which actuating nut has a relatively exposed portion protruding axially and outwardly from the yoke top and adapted for the association therewith of torque imparting means for effecting the rotation of the nut; a power drive which comprises a housing attachable to and adapted to be fixed to said yoke structure, a hollow adaptor member rotatably mounted in said housing and adapted to fit over, and into cooperative rotation transmitting engagement with said exposed nut portion and if applied virtually forming an extension thereof for imparting a driving torque thereto, said adaptor member being axially confined when thus operatively engaged and driving mechanism contained in said housing for rotating said adaptor member.

15. For use with a valve construction having a valve housing and a valve actuating spindle, a power drive and control mechanism for the valve actuating spindle, which comprises a housing, a rotary member adapted to surround the spindle and effective to axially move the same when rotated, which member is rotatably mounted in said housing, a septum dividing said housing substantially into an upper and a lower chamber relative to the spindle axis and relative to the valve housing as a defining basis and which septum extends substantially transversely of said rotary member, a power-driven worm gear mechanism arranged in the first mentioned chamber for driving said rotary member, said worm gear mechanism having a driving worm which is axially and resiliently displaceable as a result of predetermined excess thrust reaction from the spindle, an overload responsive limit switch arranged outside of although adjacent to the first mentioned chamber and arranged to be accessible substantially by way of the last mentioned chamber and having a rotary actuator member extending into the first mentioned chamber by way of being journaled in the wall thereof and due to cam arm connection extending into cooperative relationship with said displaceable worm to transmit axial movement of said worm to said overload responsive switch, and a distance limit switch mechanism arranged in the lower chamber and adjacent said overload responsive mechanism for stopping said motor driven mechanism at predetermined point of spindle movement.

RUSSELL C. BALL.